United States Patent
Toumura et al.

(10) Patent No.: US 9,071,612 B2
(45) Date of Patent: Jun. 30, 2015

(54) SERVICE PROVIDING SYSTEM

(75) Inventors: Kunihiko Toumura, Hachioji (JP); Yoshiteru Takeshima, Tokyo (JP); Naoki Haraguchi, Kawasaki (JP)

(73) Assignee: Hitachi, Ltd., Tokyo (JP)

(*) Notice: Subject to any disclaimer, the term of this patent is extended or adjusted under 35 U.S.C. 154(b) by 263 days.

(21) Appl. No.: 13/568,682

(22) Filed: Aug. 7, 2012

(65) Prior Publication Data

US 2013/0205011 A1 Aug. 8, 2013

(30) Foreign Application Priority Data

Oct. 17, 2011 (JP) ................................ 2011-227563

(51) Int. Cl.
 G06F 15/16 (2006.01)
 H04L 29/08 (2006.01)
 H04L 29/12 (2006.01)

(52) U.S. Cl.
 CPC ........ *H04L 67/1031* (2013.01); *H04L 61/1511* (2013.01); *H04L 61/2007* (2013.01)

(58) Field of Classification Search
 CPC ............... H04I 67/1031; H04I 61/2007; H04I 61/1511; H04L 47/10; H04L 47/12; H04L 47/125; H04L 69/22; H04L 45/74; H04L 61/20; H04L 67/1004; H04L 67/1002
 USPC ............................ 709/223, 224, 238, 232, 24
 See application file for complete search history.

(56) References Cited

U.S. PATENT DOCUMENTS

| | | | | |
|---|---|---|---|---|
| 7,284,051 | B1* | 10/2007 | Okano et al. | 709/226 |
| 2003/0172145 | A1* | 9/2003 | Nguyen | 709/223 |
| 2011/0082931 | A1 | 4/2011 | Wang et al. | |
| 2012/0102192 | A1 | 4/2012 | Takeshima et al. | |

FOREIGN PATENT DOCUMENTS

| | | |
|---|---|---|
| CN | 101304366 A | 11/2008 |
| CN | 101340327 A | 1/2009 |
| JP | 08-030472 | 2/1996 |
| JP | 2006-209465 A | 8/2006 |
| JP | 2012-090194 A | 5/2012 |

OTHER PUBLICATIONS

Baba, Tomomitsu, et al.; A DNS based implementation on widely load balancing mechanism; May 15, 1998; IPSJ SIG Technical Report, vol. 98, No. 36; pp. 37-42.
Japan Patent Office Notification of Reasons for Refusal on application 2011-227563 mailed Mar. 4, 2014; pp. 1-2.
Decandia, Guiseppe, et al.; Dynamo: Amazon's Highly Available Key-value Store; 21$^{st}$ ACM Symposium on Operating Systems Principles, Oct. 14-17, 2007; pp. 205-220; Stevenson, WA.

* cited by examiner

OTHER PUBLICATIONS

Tsuchiya, Masatoshi; Construction of University Mail Hosting System Based on Authentication Database; Dec. 15, 2009; Information Processing Society of Japan SIG Technical Report, No. 7; pp. 1-6.

(Continued)

*Primary Examiner* — Frantz Jean
(74) *Attorney, Agent, or Firm* — Foley & Lardner LLP

(57) ABSTRACT

In a system with a terminal sending a request, when a load distributing unit distributes the request to many service providing apparatuses, the load distributing unit becomes a bottleneck of performance and/or a single point of failure. When the load is distributed to the service providing apparatuses without using the load distributing unit, a particular function is required on the terminal side to appropriately select one of apparatuses. A name resolution unit including an address group management table with IP addresses to select, for a request from a terminal, an address from the table to return the address to the terminal and a plurality of service providing apparatuses to which at least zero IP address selected from the table is allocated without duplication are arranged such that each service providing apparatus is allocated with IP addresses according to processing performance thereof, thereby conducting appropriate load distribution.

17 Claims, 15 Drawing Sheets

ADDRESS GROUP MANAGEMENT TABLE www.example.com

| # | ADDRESS GROUP |
|---|---|
| 1 | 2001:db8::0000:0000/96 |
| 2 | 2001:db8::0001:0000/96 |
|   | ... |
| 15 | 2001:db8::000f:0000/96 |

SERVICE PROVIDING APPARATUS LIST

| # | SERVICE PROVIDING APPARATUS IDENTIFIER |
|---|---|
| 1 | serv1 |
| 2 | serv2 |
|   | ... |
| n | servn |

IN-CHARGE IP ADDRESS LIST

| # | IP ADDRESS |
|---|---|
| 1 | 2001:db8::0000:0001 |
| 2 | 2001:db8::0000:0005 |
|   | ... |
| m | 2001:db8::000f:ffff |

MONITOR-TARGET SERVICE PROVIDING APPARATUS LIST                801

| # | MONITOR-TARGET SERVICE PROVIDING APPARATUS IDENTIFIER | TRANSFER IP LIST | LOAD ADJUSTMENT DAY AND TIME |
|---|---|---|---|
| 1 | serv2 | 2001:db8::0000:0002, 2001:db8::0000:0006,··· | 2011/1/1 10:00 |

FIG. 9

MONITORING SERVICE PROVIDING APPARATUS LIST                901

| # | MONITOR-TARGET SERVICE PROVIDING APPARATUS IDENTIFIER | TRANSFER IP LIST |
|---|---|---|
| 1 | serv4 | 2001:db8::0000:0004, 2001:db8::0000:0008,··· |
| 2 | serv2 | 2001:db8::0000:0014, 2001:db8::0000:0018,··· |

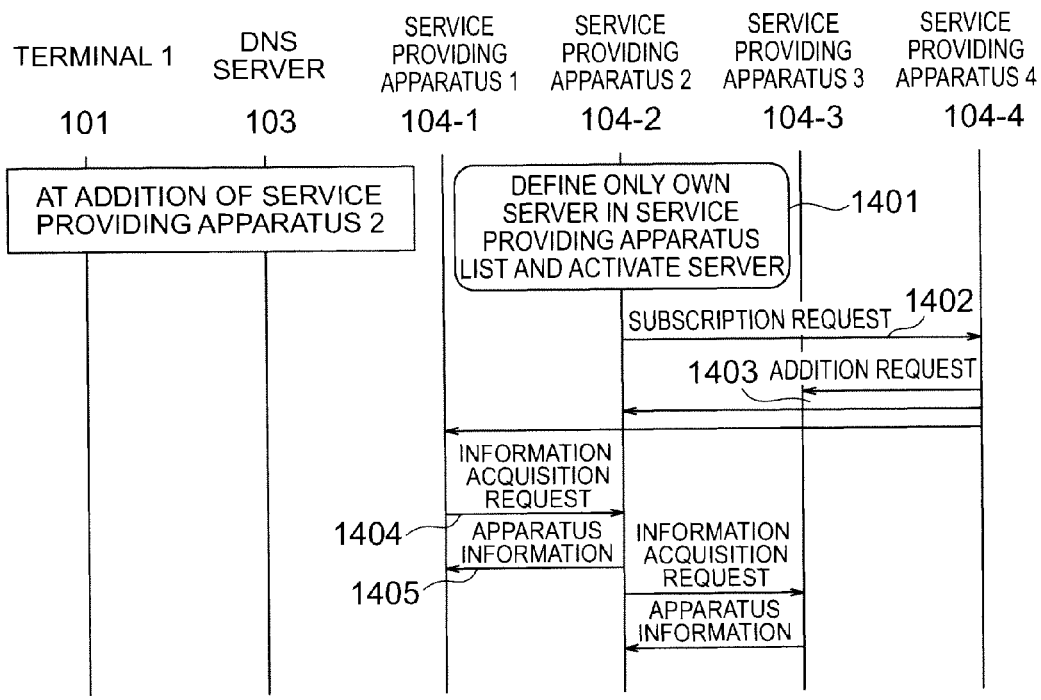

SERVICE PROVIDING SYSTEM

INCORPORATION BY REFERENCE

This application claims priority based on Japanese patent application. No. 2011-227563 filed on Oct. 17, 2011, the entire contents of which are incorporated herein by reference.

BACKGROUND

The subject matter disclosed in the present specification relates to a server system to provide services via a network in response to a request from a terminal.

In service providing systems, for example, in the web service system, it is general practice that a user desiring a service on a terminal side accesses a service providing apparatus on a network, to thereby receive the service. When the number of users increases, it is required to enhance performance on the service providing system side.

To strengthen the system performance, an approach to enhance performance of constituent components of the system (scaleup approach) and an approach to increase the number of constituent, components of the system (scale-out approach) are available. In the scaleup approach, the system performance may be strengthened only up to the upper limit of enhancement of the system constituent components. Hence, it is required to primarily take the scale-out approach in a large-scale service providing system.

When the scale-out approach is employed for a service providing system in which the system receives a query for a service from, a terminal to provide the service to the terminal, there has been used a method in which a particular appliance called a load distributing unit is arranged in the preceding stage of a plurality of service providing apparatuses. In this method, each terminal having a request accesses the load distributing unit arranged in the preceding stage. The load distributing unit accessed by the terminal selects one appropriate service providing apparatus from the service providing apparatuses under control thereof in consideration of the load imposed on the service providing apparatuses and then sends the request of the terminal to the selected service providing apparatus. When the system performance is insufficient, it is possible to enhance the processing performance in the scale-out approach by increasing the number of service providing apparatuses under control of the load distributing unit in the system.

In the method described in U.S. Pat. No. 7,284,051, name resolution is conducted before a terminal accesses a service providing apparatus. When responding to a name resolution request from a terminal an appropriate service providing apparatus is selected as described for the operation of the load distributing unit, and then information required for the terminal to access the service providing apparatus as a distribution target is returned to the terminal.

"Dynamo: Amazon's Highly Available Key-Value Store" of Giuseppe DeCandia et al in the Proceedings of the 21st ACM Symposium on Operating Systems Principles, Stevenson, Wash., October 2007 describes a method for use in a system in which a storage service is provided for a service providing apparatus of scale-out type. According to the method, to adjust the amount of data to be handled by each service providing apparatus according to performance thereof, one or more virtual nodes is or are assigned to each service providing apparatus. By changing the assignment of virtual nodes, the amount of stored data to be handled by each service providing apparatus is adjusted.

SUMMARY

The scale-out approach using a load distributing unit is effectively applicable only when the quantity of processing in each service providing apparatus is considerably larger than that of processing required for the distribution processing in the load distributing unit. That is, when the quantity of processing in each service providing apparatus is small or the service providing apparatus has high performance, the distribution processing in the load distributing unit becomes a bottleneck, which determines the upper limit of the overall system performance. At occurrence of failure in the load distributing unit, it is not possible to access any service providing apparatus under control of the load distributing unit. Hence, to cope with such failure in the load distributing unit, it is necessary, for example, to duplicate the load distributing unit, which leads to high cost of the system.

In the load distribution described in U.S. Pat. No. 7,284,051 employing the name resolution, after the name resolution is carried out, an access to the service providing device is possible even if failure occurs in the name resolution unit. However, to appropriately conduct the name resolution, it is required that information of, for example, a path between a terminal and a service providing apparatus is collected to keep the state in a saving unit. In this situation, if failure occurs in the saving unit keeping therein the information, the name resolution is difficult and it is accordingly difficult to access the service providing system after this point of time.

In the load distribution method described in "Dynamo: Amazon's Highly Available Key-Value Store" of Giuseppe DeCandia et al, the amount of stored data to be handled by each service providing apparatus is adjustable according to the number of virtual nodes assigned thereto. However, since a terminal accesses either one of the service providing apparatuses without considering where data to be accessed is stored, a transfer of processing is again conducted to actually access the data. Hence, as in the load distribution of the load distribution method described above, it is likely that the transfer of processing becomes a bottleneck. To avoid this difficulty, it is considerable that the terminal side includes a processing section to determine a data storage destination. However, there remains a problem in which it is required that a program to determine a data storage destination is distributed to all terminals and information required according to the states of the service providing apparatuses is notified to all terminals.

In the present specification, disclosed is a method and a service providing system implementing the method, the method removing the problem of the prior art in which the feature or function for the load distribution likely becomes a bottleneck and/or a point of failure and a function for the load distribution is required on the terminal side for the load distribution.

It is assumed that when a terminal accesses a service providing apparatus, a service providing system disclosed issues a request for name resolution of an identifier of a service providing apparatus to a name resolution unit and then issues a service request to an Internet Protocol (IP) address obtained as a result of the name resolution. The service providing system further has aspects as follows.

The service providing system includes a name resolution unit including an address group management table having stored a plurality of IP addresses to execute processing in which the unit selects, for a request from a terminal, an address from the address group management table to return the address to the terminal and a plurality of service providing apparatuses to which at least zero IP address selected from the address group management table is allocated without duplication, wherein the load is distributed by allocating IP addresses to each service providing apparatus according to processing performance of the service providing apparatus.

Each service providing apparatus to receive a request from a terminal copes with a variation in the load by executing processing to reduce load difference as below. The service providing apparatus measures the load on a second service providing apparatus as a monitor target. If the load on the monitor-target service providing apparatus is more than a load on the service providing apparatus as a monitoring apparatus, the monitoring service providing apparatus moves IP addresses allocated to the monitor-target service providing apparatus with a higher load to the monitoring service providing apparatus with a lower load.

The name resolution unit includes a function in which the addresses in the address group management table are classified into two or more groups such that by using a function to select one or more address groups based on "date and time", addresses to be used to respond to a request from a terminal are changed for each "date and time". As a result, it is possible to secure unused addresses required for the load transfer with a high probability.

According to the present disclosure, disclosed is a service providing system including a plurality of service providing apparatuses and at least one name resolution unit, either one of the service providing apparatuses responding to a service request from a terminal, wherein the name resolution unit manages an address group including n IP addresses allocated to a service providing apparatus group including k service providing apparatuses (n is equal to or greater than k) and includes a name resolution request processing section for selecting, in response to the service request from die terminal, either one IP address from the address group managed by the name resolution unit, to thereby make a response, each of the service providing apparatuses is allocated with m IP addresses (m is equal to or greater than zero) selected from the n IP addresses managed by the name resolution, unit, without duplication with, respect to any other one of the service providing apparatuses, and includes a terminal request processing section for providing, based on the response to the name resolution request, a service to the service request from, the terminal, and a load distributing function section to conduct load distribution of a load between the service providing apparatus and any one other service providing apparatus, and the service providing apparatus is a monitor-target service providing apparatus a load of which is monitored by any one other service providing apparatus as a monitoring service providing apparatus; and the load distributing function section of the monitoring service providing apparatus moves, when a high load is imposed on the monitor-target service providing apparatus, allocation of IP addresses from the monitor-target service providing apparatus to the monitoring service providing apparatus of its own.

The service providing system may also be configured such that the load distributing function section of the monitoring service providing apparatus transmits, in the moving of allocation of IP addresses, an address transfer request to the monitor-target service providing apparatus when the load on the monitor-target service providing apparatus is higher at least a predetermined value than a load on the monitoring service providing apparatus of its own, and registers, at reception of an address transfer response including IP addresses as an object of the moving of allocation of IP addresses from the monitor-target service providing apparatus, the IP addresses included in the address transfer response, as IP addresses to be allocated to the monitoring service providing apparatus of its own.

Due to the configuration described above, it is possible to distribute the load to the service providing apparatuses without disposing a unit such as a load distributing unit which becomes a single point of failure and/or a bottleneck between a terminal and a service providing apparatus, to thereby strengthen immunity against failure.

The name resolution unit required for the name resolution does not keep therein dynamic data, i.e., load information of each service providing apparatus, but keeps therein static data, i.e., an IP address group including IP addresses as a state. Hence, at occurrence of failure in the system, it is possible to easily restore any service providing apparatus from failure, for example, by storing data of the IP address group in a stable storage.

Even when a plurality of the name resolution units is arranged, it is only necessary to supply each name resolution unit with static data. Hence, it is not necessary to prepare a complex, procedure, for example, a procedure to keep consistency with respect to the dynamic update of shared data.

The load imposed on each service providing apparatus is adjusted by allocating IP addresses to the service providing apparatus according to processing performance thereof. Hence, a terminal desiring to issue a request is capable of delivering the request to an appropriate server by use of an IP communication scheme as a standard scheme of the terminal. Also, when a service providing apparatus having a particular IP address is changed as a result of transfer of an IP address, a new request is appropriately re-directed by the routing function as a standard function of the IP network.

By changing in time series the group of addresses to be returned from the name resolution unit, it is possible to secure addresses on the service providing apparatus side on which no session has been established between a terminal and a service providing apparatus. Hence, in the transfer of an IP address in a service providing apparatus, it is possible to select an unused address. When session management is required in a service providing apparatus, for example, with respect to a protocol on Transmission Control Protocol (TCP)/IP, complex processing is required to transfer an IP address being used by a session in operation. Hence, it is desirable to transfer an unused IP address. In the present method, it is possible to secure unused IP addresses with a higher probability, and the processing cost required for the load equalizing operation is reduced.

According to the teaching herein, there is provided a service providing system including a load distribution function in which the load distribution function does not easily become a bottleneck and/or a paint of failure and is not required on the terminal side.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a diagram showing an example of a configuration of a service providing apparatus list;

FIG. 7 is a diagram showing an example of a configuration of an in-charge IP address list;

FIG. 8 is a diagram showing an example of a configuration of a monitor-target service providing apparatus list;

FIG. 9 is a diagram showing an example of a configuration of a monitoring service providing apparatus list;

FIG. 14 is a diagram showing an example of an operation sequence of a service providing system;

FIG. 15 is a diagram showing an example of a configuration of a service providing apparatus list in an N+M service providing apparatus configuration;

DESCRIPTION OF THE EMBODIMENTS

First Embodiment

Figure 1:
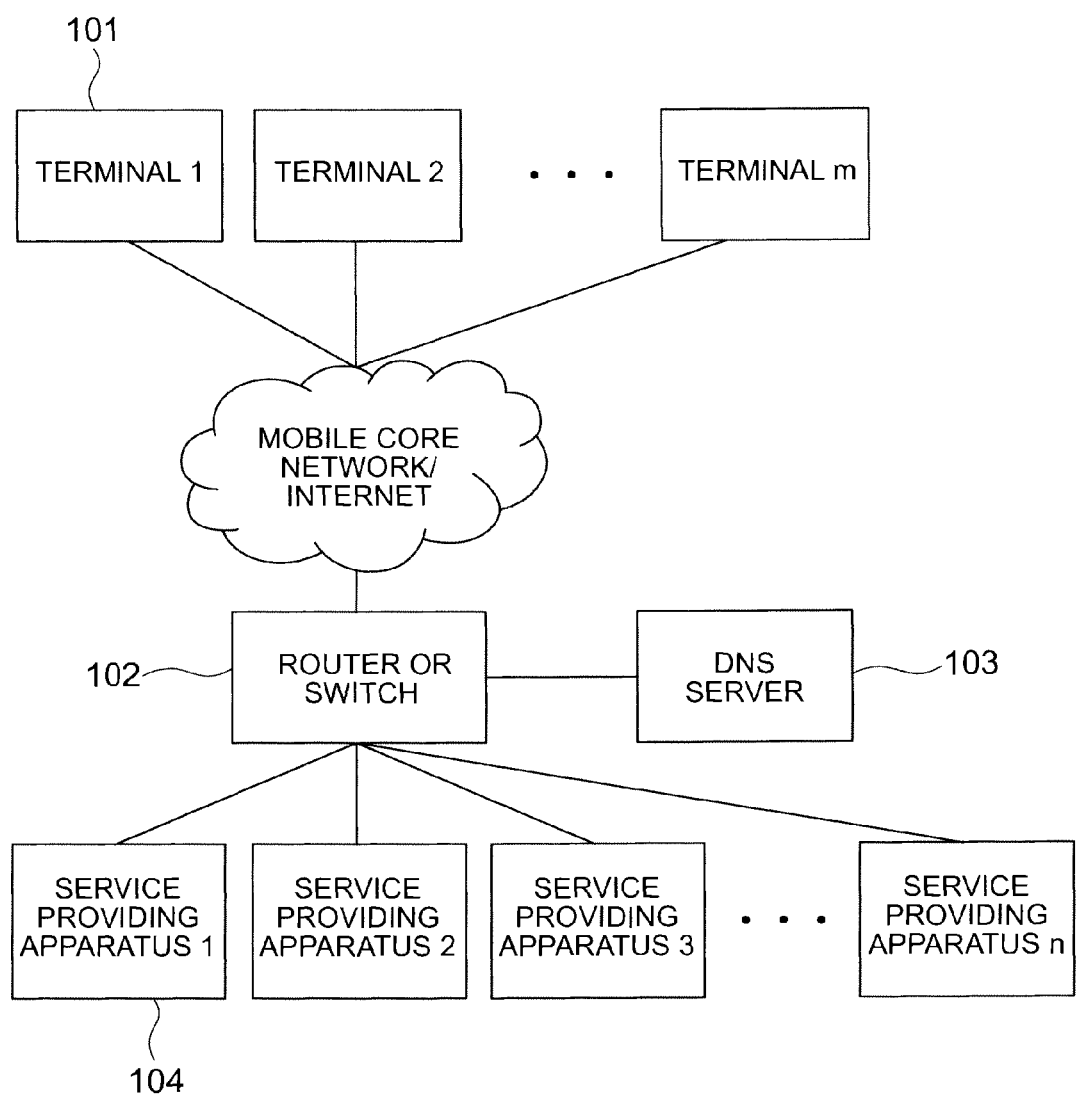
FIG. 1 is a block diagram showing an example of the overall configuration of a service providing system.

FIG. 1 shows an overall configuration of a server providing system according to a first embodiment.

Service providing apparatuses 104 and a DNS server 103 are coupled to a router or switch 102 constituting an external network. The router or swatch 102 is coupled via a mobile core network/internet to terminals 101. The connection topology of the first embodiment is shown only as an example. The present embodiment is applicable to any connection topology in which the terminals 101, the DNS server 103, and the service providing apparatuses 104 are mutually accessible by use of the internet protocol.

Figure 2:
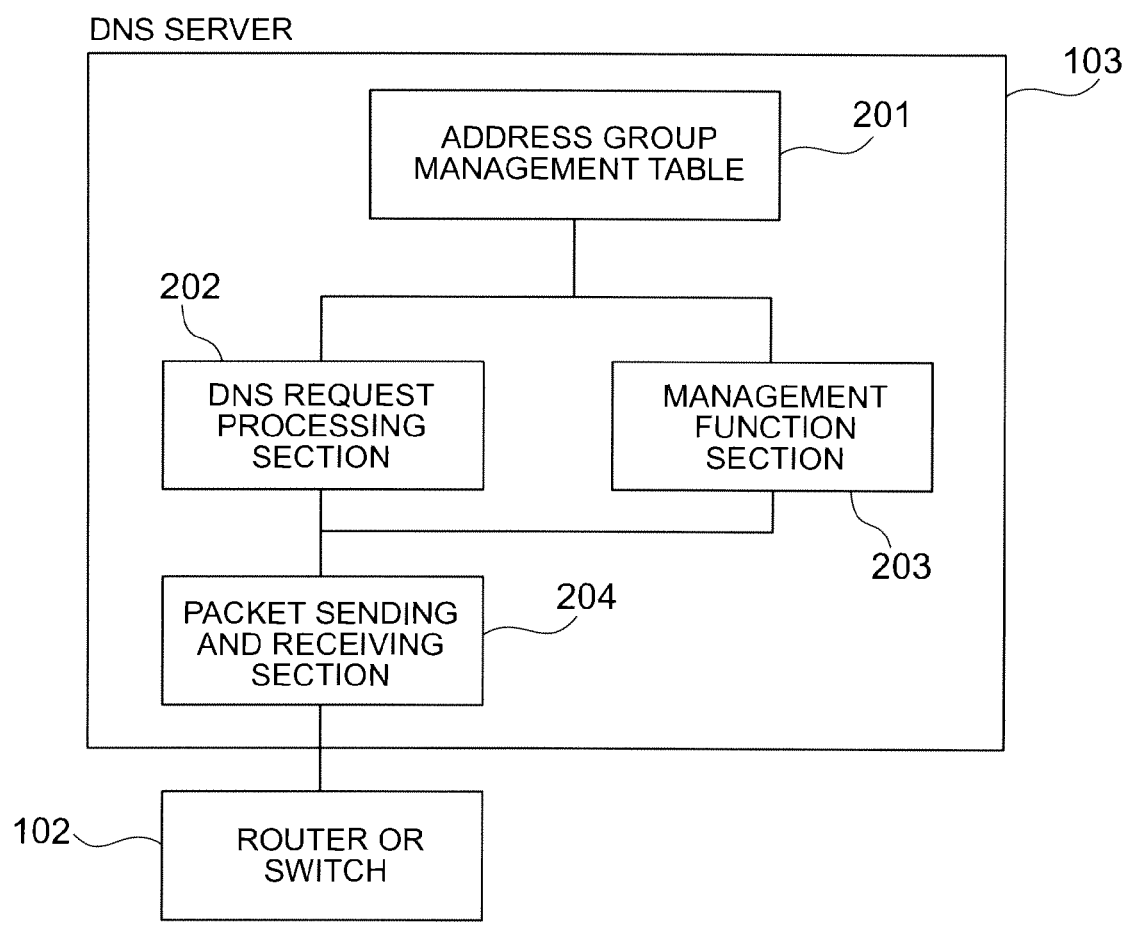
FIG. 2 is a diagram showing an example of a functional configuration of a Domain Name System (DNS) server.

FIG. 2 shows a functional configuration of the DNS server 103 as an example of a name resolution unit according to the present embodiment. As an example of name resolution, the DNS server 103 converts a domain name into an IP address. The DNS server 103 is coupled via a packet sending and receiving section 204 to a router or switch 102. A name resolution request from the terminal 101 is processed in a name resolution request processing section (to be referred to as a DNS request processing section hereinbelow) 202. Processing such as registration or deletion of an address to or from an address group management table 201 is executed by a management function section 203.

Figure 18:
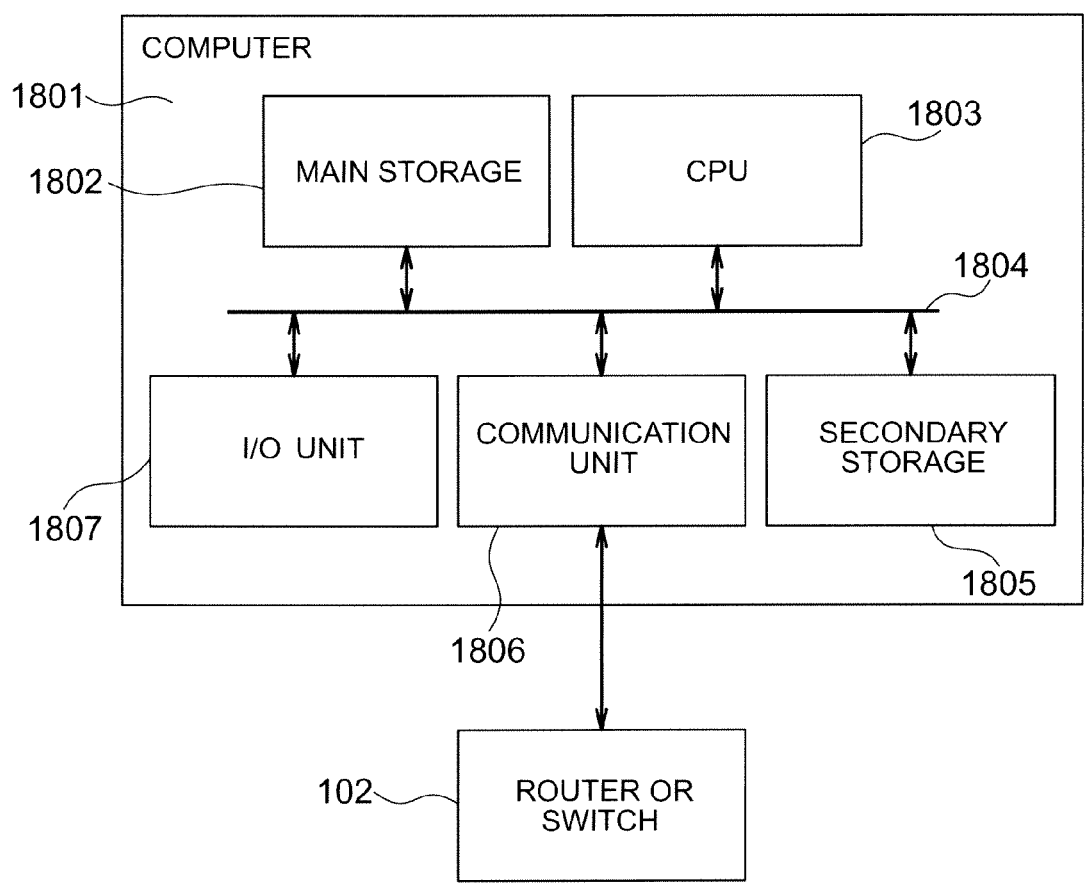
FIG. 18 is a block diagram showing an example of a hardware configuration of a DNS server and a service providing apparatus.

FIG. 18 shows an example of a hardware configuration of the DNS server 103 and the service providing apparatus 104 functional structure of which will be described later.

These devices may be configured using a general computer 1801 including a main storage 1802, a Central Processing Unit (CPU) 1803, a secondary storage 1805 such as a hard disk drive, an input/output (I/O) device 1807 including a display and a keyboard, a communication unit 1806 to be coupled to the router or switch 102, and an internal communication line 1804 such as a bus to couple the constituent components to each other.

For example, the address group management table 201 in the DNS server 103 is arranged in the main storage 1802 and in the secondary storage 1805 to perpetually keep data.

Each processing, which will be described below, is implemented as follows. At execution of the processing, a program for the processing stored in the secondary storage 1805 is copied onto the main storage 1802 and is then interpreted to be executed by the CPU 1803. The sending and receiving or communication processing is carried out via the communication unit 1806.

Figure 3:
FIG. 3 is a block diagram showing an example of an address group management table.

FIG. 3 shows an example of the address group management table 201 of the DNS server 103. In this table, as an address associated with a name (a domain name in this embodiment) to be resolved, IPv6 addresses are registered to a plurality of entries for each subnet. While IPv6 addresses are used to represent the group of addresses in FIG. 3, IPv4 addresses may also be used to represent these addresses. To each of the entries of the address group management table 201, the addresses having been allocated to each of service providing apparatuses 104 is registered.

Next, description will be given of processing in which the DNS server 103 responds to a request from the terminal 101 by using the address group management table 201.

Figure 4:
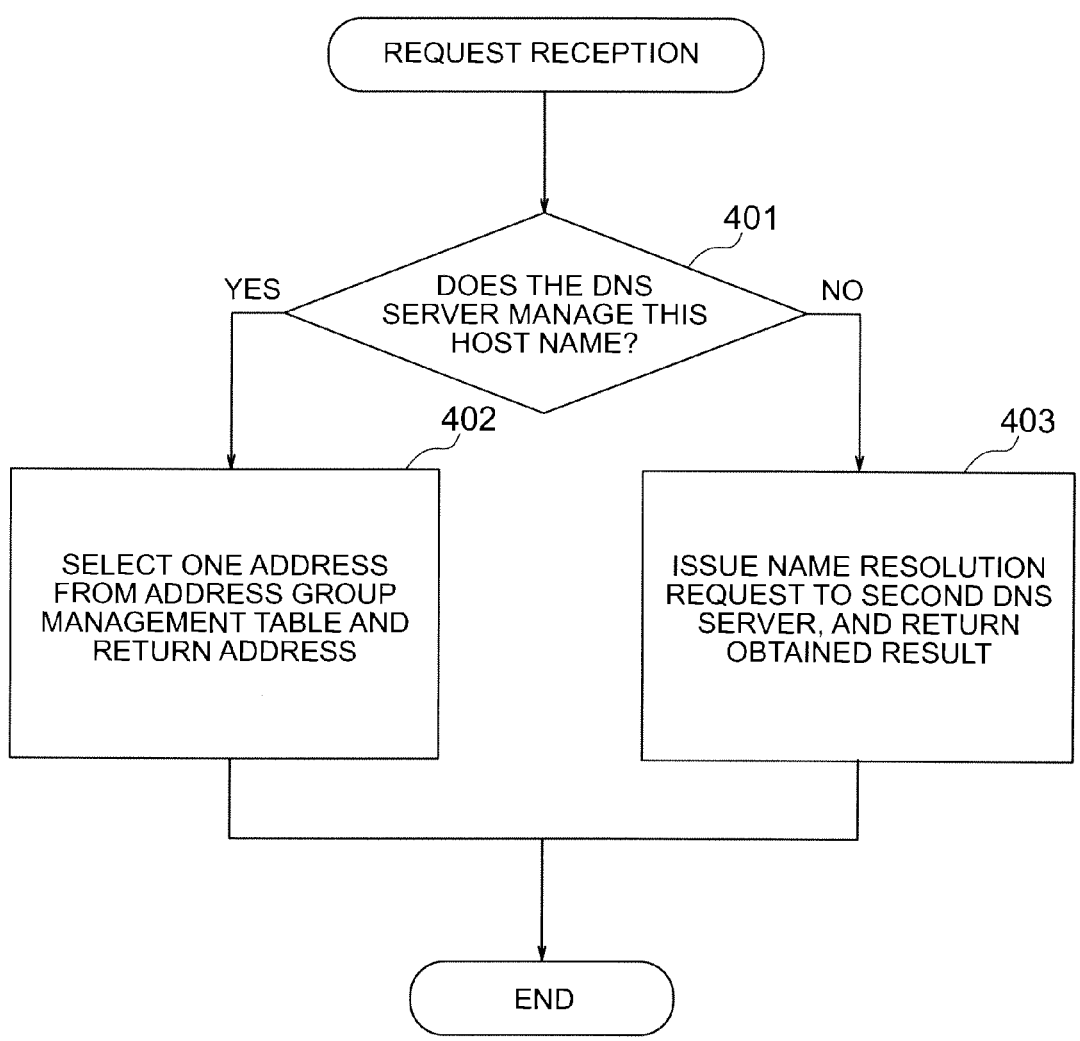
FIG. 4 is a flowchart to explain an example of processing in a DNS server.

FIG. 4 shows a flow of processing to be executed when the DNS server 103 receives a request from the terminal 101. In step 401, a check is made to determine which name corresponds to the name resolution request issued from the terminal 101. When using an address group management table of the type of, for example, that shown in FIG. 3, if the request corresponds to name resolution of www.example.com, control goes to step 402.

In step 402, the DNS server 103 selects one of the addresses stored in the address group management table and returns the address to the terminal 101. To select the address for the response, there may be employed any method only if each of the addresses is selected with substantially an equal chance or probability. For example, the address may be sequentially selected beginning at the first address or may be selected from all addresses by use of uniform random numbers.

If step 401 results in no, that is, if the request corresponds to a name not managed in the address group management table 201, the request is transferred to a second DNS server. When a response is received from the second DNS server, the pertinent DNS server 103 returns the response to the terminal 101 (step 403). This processing is executed at reception of a name resolution request for a name not associated with the service providing apparatus 104. If a name resolution request only for a name associated with the service providing system is supported, the DNS server 103 may simply return a name resolution error to the terminal 101.

Next, description will be given of the service providing apparatus 104.

Figure 5:
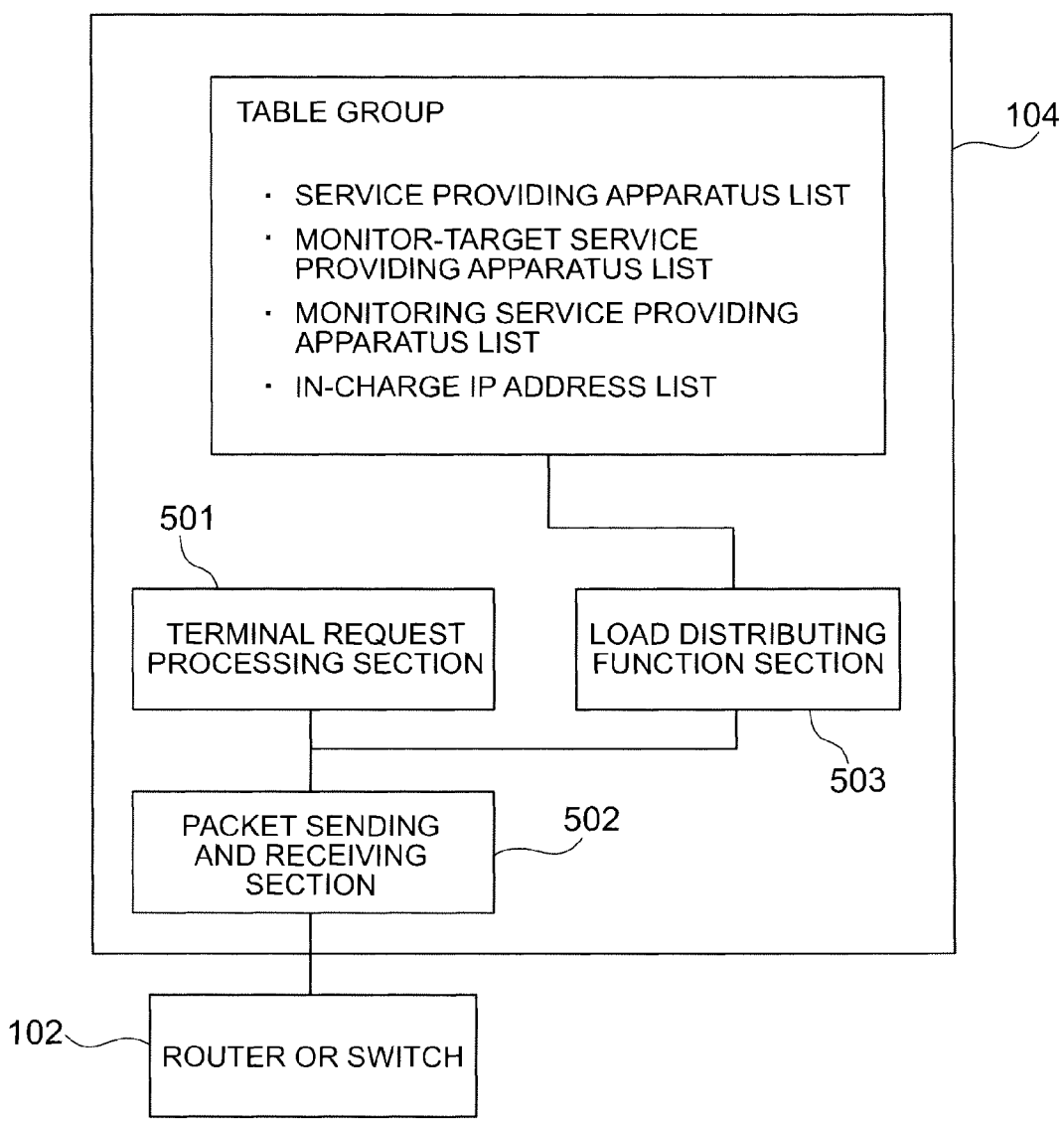
FIG. 5 is a diagram showing an example of a functional configuration of a service providing apparatus.

FIG. 5 shows a configuration of the service providing apparatus 104. The service providing apparatus 104 is coupled via a packet sending and receiving section 502 to the router or switch 102. Processing of a service provided from the service providing apparatus 104 to the terminal 101 is executed in a terminal request processing section 501. Load distribution is conducted by a load distributing function section 503. The load distributing function section 503 includes four tables, i.e., a service providing apparatus list 601, a monitor-target service providing apparatus list 801, a monitoring service providing apparatus list 901, and an in-charge IP address list 701.

FIG. 6 shows an example of a configuration the service providing apparatus list 601.

The service providing apparatus list 601 manages identifiers of n service providing apparatuses 104 sharing the load. The values in this list are set by the manager at initiation of each service providing apparatus 104 and are updated by the load distributing function section 503 when a service providing apparatus 104 is added to or deleted from the service providing system.

FIG. 7 shows an example of a layout of data in the in-charge IP address list 701.

The in-charge IP address list 701 stores therein m IP addresses allocated to a service providing apparatus 104 having this list. The in-charge IP address list 701 is set by the manager at initiation of the service providing apparatus 104 and is updated by the load distributing function section 503 when an IP address is moved to or from another node, i.e., at handover or takeover of an IP address.

FIG. 8 shows an example of a configuration the monitor-target service providing apparatus list 801.

The monitor-target service providing apparatus list 801 stores therein information of each service providing apparatus 104 as a load monitor target to be monitored by a service providing apparatus 104 having this list.

In this example shown in FIG. 8, the pertinent service providing apparatus 104 recognizes a service providing apparatus 104 having an identifier of serv2 as a monitor target. The monitor-target service providing apparatus list of FIG. 8 includes a list of candidates of IP addresses to be taken over when a high load is imposed on the monitor-target service providing apparatus 104 or when failure takes place therein. The list 801 also includes load adjustment date and time, i.e., "date and time" when the allocation of an associated IP address is moved to the monitor-target service providing apparatus 104 as a result of the previous load adjustment. The load adjustment date and time is employed to prevent an event in which the movement of the address allocation successively takes place due to the load in a short period of time.

In the present embodiment, the movement of the IP address allocation is not synchronized with the movement of the load. Hence, if the IP address allocation is moved in any situation when there exists difference in the load, IP addresses undesirably move as a result exceed in quantity the IP addresses required for the movement of the load, depending on cases. To avoid this difficulty, the IP address movement occurring in a short period of time is restricted by referring to the load adjustment date and time.

FIG. 9 shows an example of a data layout in the monitoring service providing apparatus list 901.

The monitoring service providing apparatus list 901 records therein each service providing apparatus 104 which is monitoring each service providing apparatus 104 having this list.

According to the list of FIG. 9, the pertinent service providing apparatus 104 is being monitored by a second service providing apparatus 104 having an identifier of serv4. In the row of serv4, the transfer list stores therein candidates of addresses the allocation of which is moved to the service providing apparatus 104 having an identifier of serv4 when a high load is imposed on the pertinent service providing apparatus 104 or when failure occurs therein.

When the pertinent service providing apparatus 104 is being monitored by a single service providing apparatus 104, the information in the transfer IP address list is substantially equal to that in the in-charge IP address list 701 of the pertinent service providing apparatus 104. When the pertinent service providing apparatus 104 is being monitored by a plurality of service providing apparatuses 104, the transfer IP address list shares addresses contained in the in-charge IP address list 701.

When the pertinent service providing apparatus 104 updates the in-charge IP address list 701 due to IP address movement, i.e., takeover from or handover to a second service providing apparatus 104, it also updates the transfer IP list.

Figure 10:
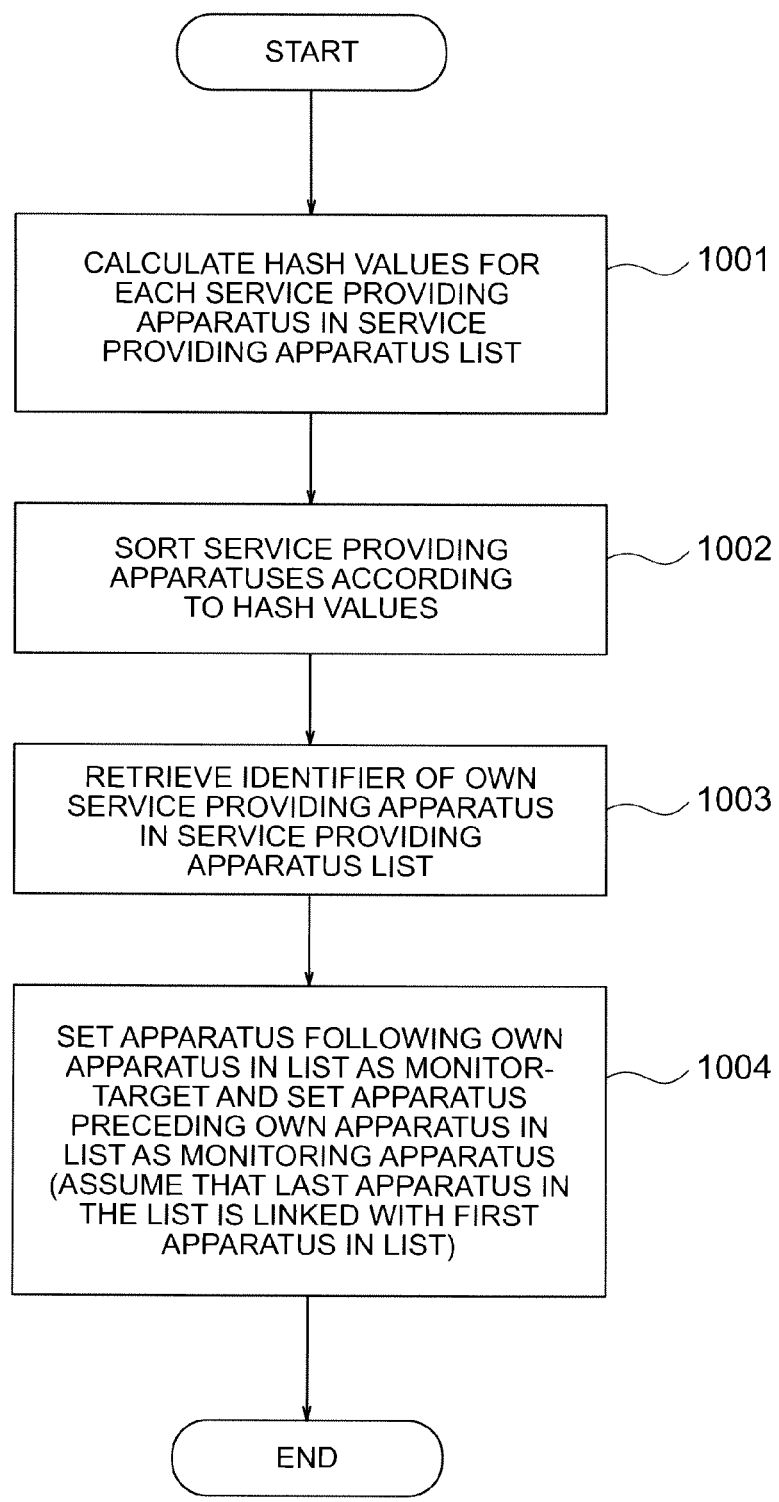
FIG. 10 is a flowchart to explain an example of processing to construct a relationship between a monitoring service providing apparatus and a monitor-target service providing apparatus.

Description will be given of a method of configuring a relationship between a monitoring service providing apparatus 104 and a monitor-target service providing apparatus 104 in the initializing stage for all service providing apparatuses 104. FIG. 10 shows a procedure employed by the load distributing function section 503 to construct the relationship.

In step 1001, the identifiers of all service providing apparatuses 104 in the service providing apparatus list 601 are ordered in an appropriate fashion. Since it is only required to define a relationship with respect to the ordering of the identifiers, a hash value may be calculated for each of the service providing apparatuses 104, to thereby order the identifiers of the apparatuses 104 in a sequence of the hash values. Or, the identifiers of the service providing apparatuses 104 may be ordered by use of a dictionary, for example, in an order in which the identifiers would appear in the dictionary. In this example, the identifiers are ordered by use of the hash values.

In step 1002, the service providing apparatuses 104 ordered as above are sorted in an ascending order. In step 1003, the load distributing function, section 503 retrieves an identifier of its own service providing apparatus 104 from the service providing apparatus list 601.

In step 1004, the load distributing function section 503 sets, as a monitor-target service providing apparatus, the service providing apparatus 104 following the own service providing apparatus 104 and sets, as a monitoring service providing apparatus, the service providing apparatus 104 preceding the own service providing apparatus 104. Assuming that the service providing apparatus list 601 is configured in the form of a ring, the function section 503 sets the first service providing apparatus in the list as the monitor target of the last service providing apparatus in the list and sets the last service providing apparatus in the list as the monitoring service providing apparatus of the first service providing apparatus in the list. As a result, it is possible to execute processing by assuming that all service providing apparatuses 104 are virtually coupled to each other in ring topology.

Figure 11:
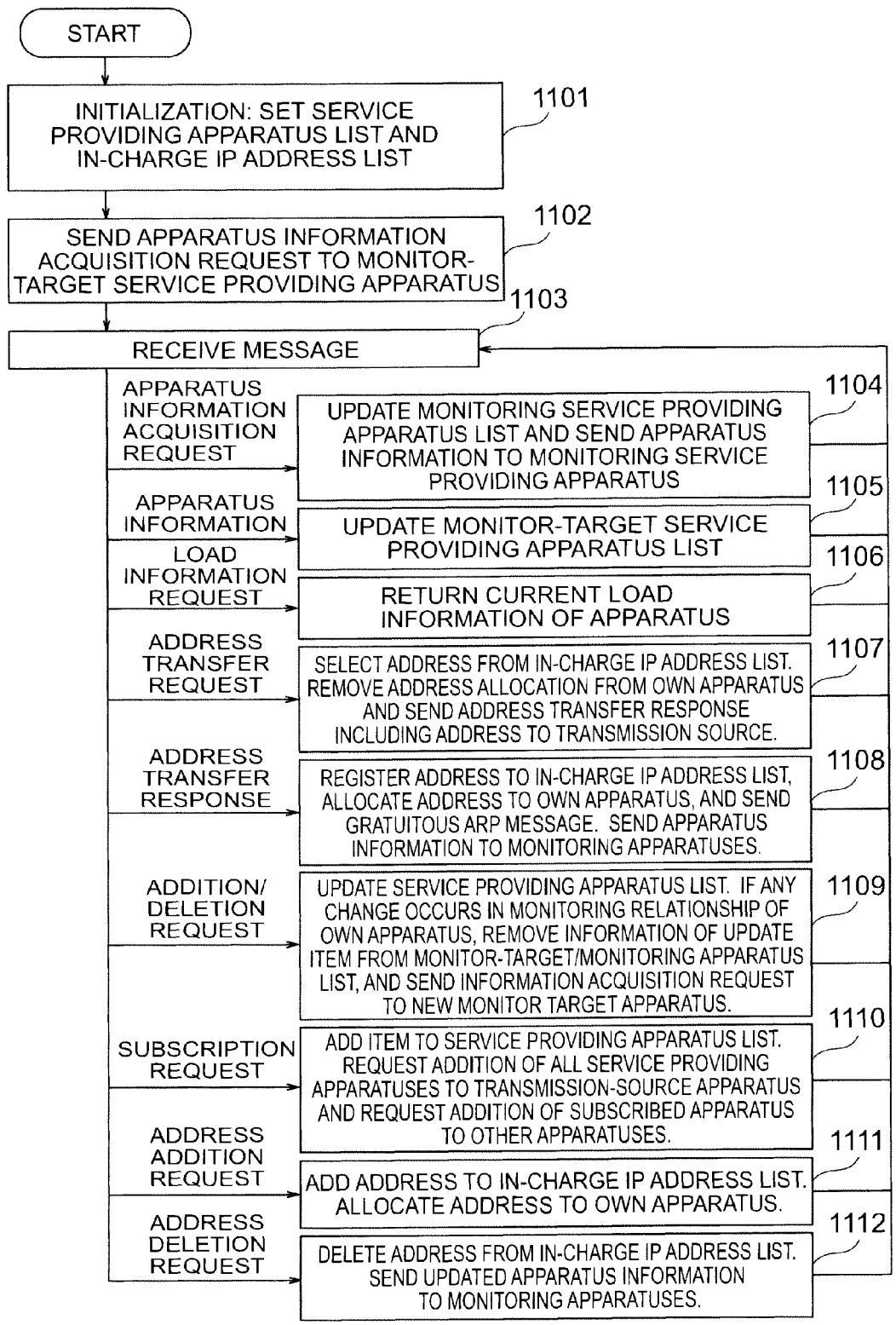
FIG. 11 is a flowchart to explain an example of processing in a load distributing function section of a service providing apparatus.

FIG. 11 shows a processing flow of the load distributing function section 503 in a service providing apparatus 104.

In step 1101, at activation of the service providing apparatus 104, the service providing apparatus list 601 and the in-charge IP address list 701 are set in the initializing operation. The in-charge IP address list 701 may be set for example, as follows. Assuming that the service providing apparatuses 104 are substantially equal in performance to each other in the initial state, substantially an equal number of addresses are assigned to each service providing apparatus 104. Or, each service providing apparatus 104 is weighted according to performance difference to assign a larger number of addresses to a service providing apparatus 104 having higher performance.

In step 1102, the load distributing function section 503 determines a monitor-target service providing apparatus 104 in the processing procedure shown in FIG. 10 and then sends an apparatus information acquisition request message. In step 1103, the load distributing function section 503 waits for reception of a message. When a message is received, the load distributing function section 503 processes the message according to information contained in the message.

When the apparatus information acquisition request message is received, the load distributing function section 503 adds an entry of the transmission-source service providing apparatus to the monitoring service providing apparatus list 901 and re-constructs the transfer IP addresses for all monitoring service providing apparatuses. The function section 503 then sends an apparatus information message including the monitoring service providing apparatus list 901 to all monitoring service providing apparatuses (step 1104).

When the apparatus information message is received, the load distributing function section 503 updates the monitor-target service providing apparatus list 801 by use of the apparatus information in the received message (step 1105).

At reception of a load information request message, the load distributing function section 503 sends information of the current load on the service providing apparatus as a load information message to the terminal 101 (step 1106). The load information includes a CPU load, communication traffic per unitary time, an Input/Output (I/O) load, and an amount of memory used. For example, in the processing in which accesses to a disk become a bottleneck, the I/O load is adopted as the load information. That is, the load information is appropriately determined according to the type of the service provided from to the service providing apparatus 104 to the terminal 101.

When an address transfer request message is received from a service providing apparatus 104 other than those in the monitoring service providing apparatus list 901, the load distributing function section 503 selects one of the unused IP addresses not being currently used from the in-charge IP address list 701. If all IP addresses have been used, for example, in a high-load operation, the load distributing function section 503 randomly selects one of the IP addresses being used.

The load distributing function section 503 deletes the selected IP address from the in-charge IP address list 701, removes the allocation of the IP address from the own service providing apparatus, and sends an address transfer response message including the IP address to the transmission-source apparatus (step 1107). Also, the IP address is deleted from the transfer IP address list in the monitoring service providing apparatus list 901.

As can be seen from the description above, in the present specification, an address transfer request indicates a request to move a destination of address allocation from a service providing apparatus as a request transmission destination to a service providing apparatus as a request transmission source.

After a first service providing apparatus 104 sends an address transfer request message to a second service providing apparatus 104 as a communication peer, when an address transfer response message is received front the second service providing apparatus 104, the load distributing function section 503 of the first service providing apparatus 104 registers an IP address included in the received message to the in-charge IP address list 701, to thereby allocate the IP address to the own service providing apparatus 104. To notify the other service providing apparatuses 104 in the system with the allocation of the IP address to the own service providing apparatus 104, the function section 503 sends a gratuitous Address Resolution Protocol (ARP) message from a packet sending and receiving section thereto. The load distributing function section 503 updates the transfer IP address list in the monitoring service providing apparatus list 901 and transmits an apparatus information message including IP address information of the registered IP address to the monitoring service providing apparatuses which are monitoring the own service providing apparatus (step 1108).

When a service providing apparatus addition, or deletion request message is received, the load distributing function section 503 updates the service providing apparatus list 601. According to the processing flow of FIG. 10, the function section 503 calculates again the relationship between the monitoring and monitor-target service providing apparatuses. If the relationship has been changed for the own service providing apparatus, the load distributing function section 503 updates information pieces of update items in the monitor-target service providing apparatus list 801 and the monitoring service providing apparatus list 901. The load distributing function section 503 then transmits an apparatus information acquisition request message to the service providing apparatus 104 set as a monitor-target service providing apparatus as a result (step 1109).

At reception of a subscription request message of a service providing apparatus, the load distributing function section 503 adds the transmission-source service providing apparatus to the service providing apparatus list 601. Then, an addition request message of all service providing apparatuses 104 other than the transmission-source service providing apparatus is sent to the service providing apparatus 104 as the subscription request message transmission source. An addition request message of the transmission-source service providing apparatus is sent to the other service providing apparatuses (step 1110).

When the address addition request message is received, the load distributing function section 503 adds an address contained in the received message to the in-charge IP address list 701 and allocates the address to the own service providing apparatus. The address is also added to the transfer IP address list of the monitoring service providing apparatus list 901. The load distributing function section 503 transmits, to the monitoring service providing apparatus 104 in which a change occurs as a result, an apparatus information message including associated apparatus information (step 1111).

At reception of an address deletion request message, the load distributing function section 503 deletes an associated address from the in-charge IP address list 701. The function section 503 also deletes the address from the transfer IP address list of the monitoring service providing apparatus list 901 and then transmits, to the monitoring service providing apparatus 104 in which a change occurs as a result, an apparatus information message including associated apparatus information (step 1112).

In parallel with the processing procedure shown in FIG. 11, the load distributing function section 503 of the service providing apparatus 104 executes processing to monitor information of operation in the other service providing apparatuses 104. This is executed according to the processing procedure shown in FIG. 12.

When the monitoring operation is started, the service providing apparatus 104 repeatedly transmits, for example, at a predetermined interval of time, a load information request message to the monitor-target service providing apparatus 104 (step 1201). If a load information message is received within a predetermined period of time, it is assumed that no failure has taken place in the monitor-target service providing apparatus 104.

After the load adjustment time and day of the monitor-target service providing apparatus list 801, if a predetermined period of time has passed before the message is received, the load distributing function section 503 calculates the load difference between the monitor-target service providing apparatus 104 and the own service providing apparatus 104 (step 1202). If the load on the monitor-target service providing apparatus is higher at least a predetermined value than that on the own service providing apparatus, the function section 503 sends an address transfer request to the monitor-target service providing apparatus 104 (step 1203). If the load difference is less than a predetermined value or if the predetermined period of time has not lapsed after the previous load adjustment, the load distributing function section 503 takes a pause for a predetermined period of time and then sends again the load information request message to the monitor-target service providing apparatus 104.

If the event in which the load information message is not received within a predetermined period of time repeatedly occurs, the load distributing function section 503 assumes occurrence of failure in the monitor-target service providing apparatus 104 and sends a deletion request message to delete the service providing apparatus from the service providing apparatus list 601 to the n service providing apparatuses 104 sharing the load.

The load distributing function section 503 extracts, from the entry of the service providing apparatus in the monitor-target service providing apparatus list 801, the transfer IP address list to be taken over from the service providing apparatus and then adds the transfer IP address list to the in-charge IP address list 701 (step 1205).

The load distributing function section 503 deletes the service providing apparatus from the service providing apparatus list 601 and determines a monitor-target service providing apparatus 104 according to the procedure shown in FIG. 10. The function section 503 transmits an apparatus information acquisition request message to the monitor-target service providing apparatus 104 (step 1206). The function section 503 again carries out the processing procedure beginning at step 1201, for example, after taking a pause for a predetermined period of time.

Figure 13:
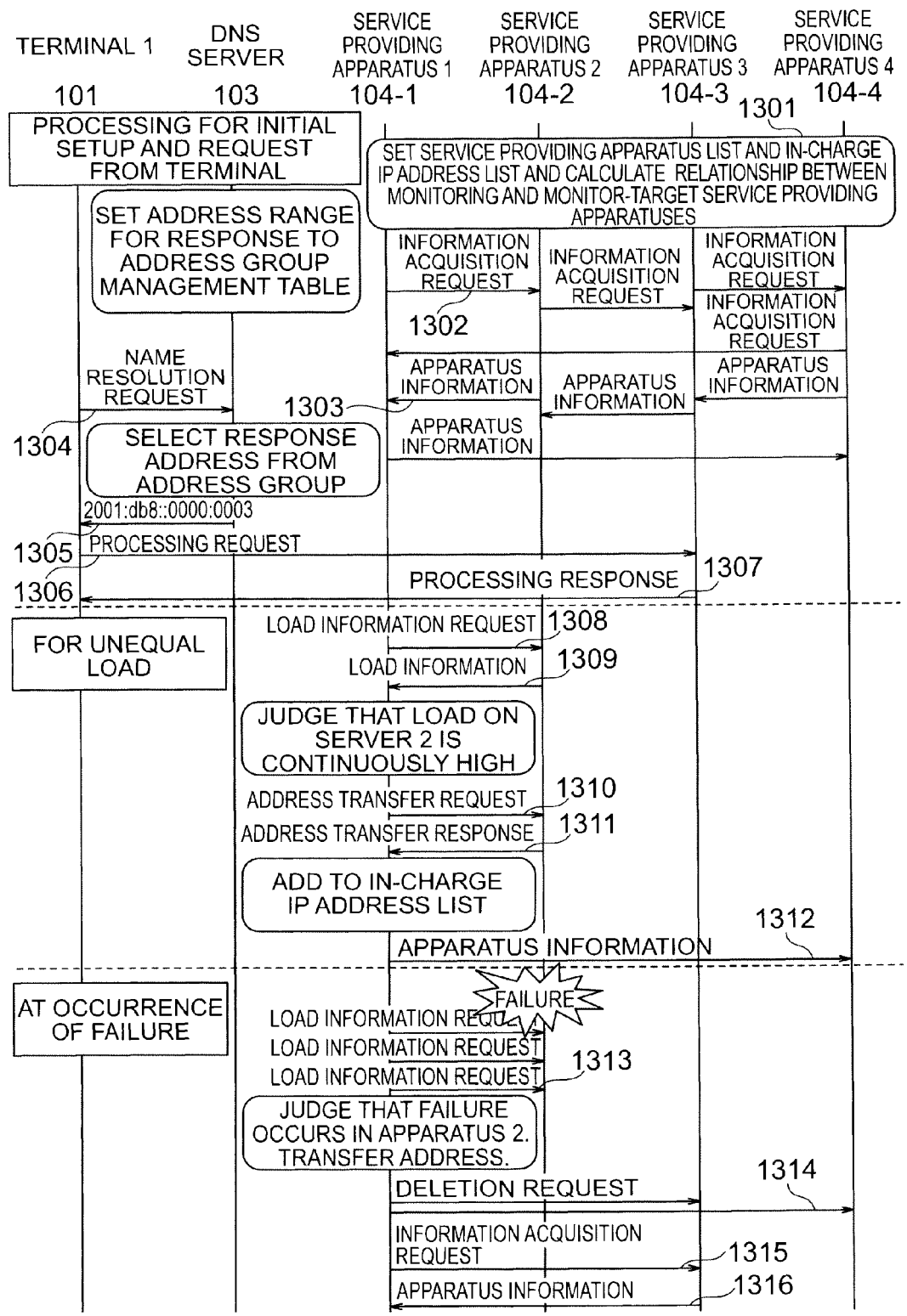
FIG. 13 is a diagram showing an example of an operation sequence of a service providing system.

FIGS. 13 and 14 show an example of operation sequences for the processing procedure described above.

Description will be given of processing for an initial setup operation and processing for a request from a terminal.

In step 1301 of FIG. 13, the manager sets the in-charge IP address list 701 and the service providing apparatus list 601 for each, service providing apparatus 104 to construct a relationship between a monitoring service providing apparatus and a monitor-target service providing apparatus according to the processing flow of FIG. 10.

The service providing apparatus 104 as a monitoring apparatus transmits an apparatus information, acquisition request to the service providing apparatus 104 as a monitor target (step 1302).

The service providing apparatus 104 having received the apparatus information acquisition request returns an apparatus information message in step 1104 of FIG. 11 (step 1303). Through the processing above, the initial setup of each service providing apparatus 104 is Completed.

To receive a service, the terminal 101 sends a name resolution request to the DNS server 103 (step 1304).

The DNS server 103 sends a response of an address to the terminal 101 according to the processing flow of FIG. 4 (step 1305).

The terminal 101 transmits a processing request to an IP address indicated by the response (step 1306). The service providing apparatus 104-3 in charge of the address sends a response to the request (step 1307).

Description will be given of processing to equalize loads when the loads of the service providing apparatuses 104-1 and 104-2 are unequal to each other.

Figure 12:
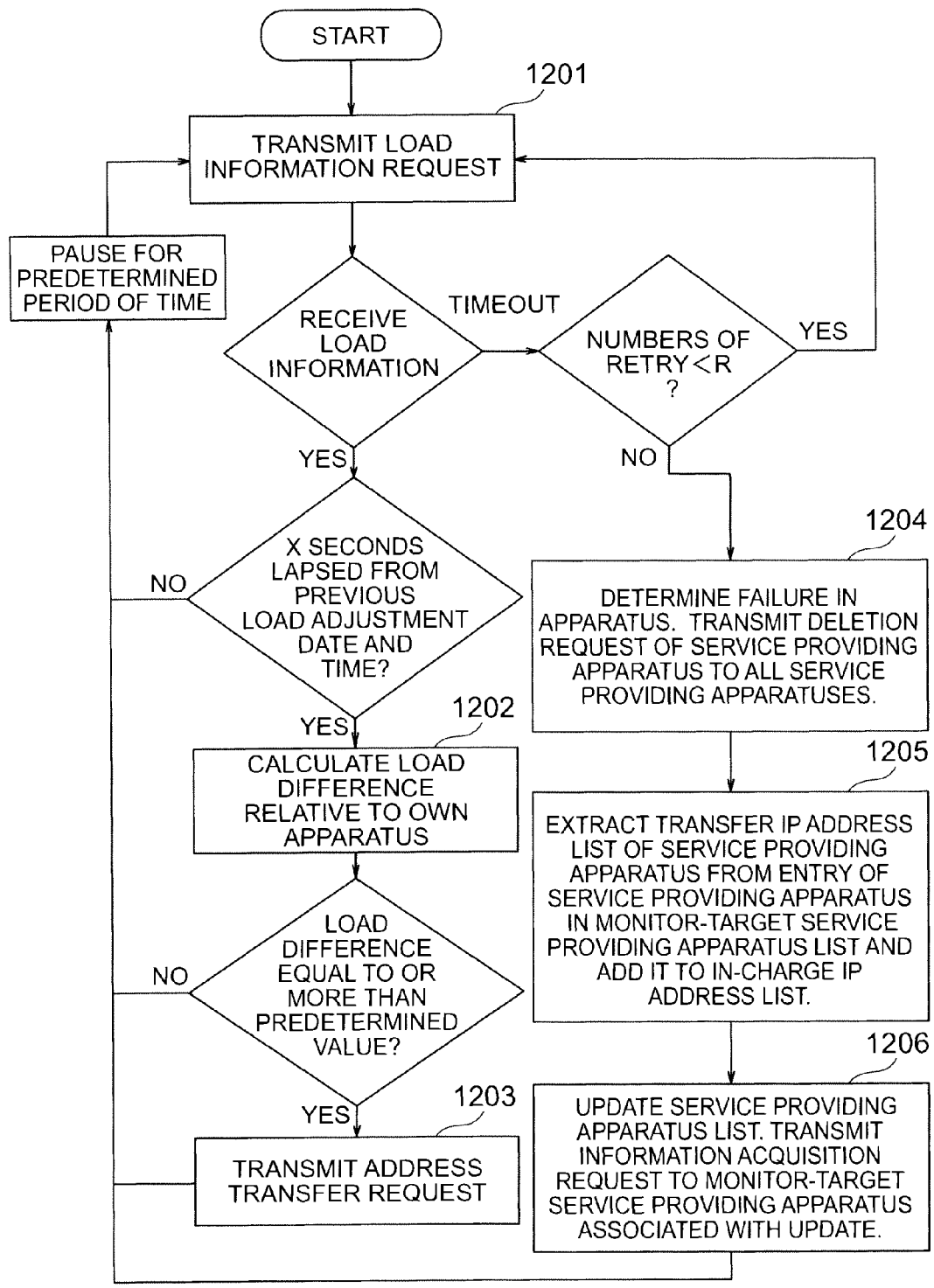
FIG. 12 is a flowchart to explain an example of processing in a load distributing function section of a service providing apparatus.

In step 1201 of the processing flow shown in FIG. 12, the service providing apparatus 104-1 repeatedly transmits, for example, at a predetermined interval of time, a load information request to the service providing apparatus 104-2 as a monitor target (step 1308).

The service providing apparatus 104-2 receives the load information request and then returns a response of current load information thereof in step 1106 of FIG. 11 (step 1309).

Assume that the service providing apparatus 104-1 having received the load information judges in step 1202 that the load difference is equal to or more than a predetermined value. The service providing apparatus 104-1 then sends in step 1203 an address transfer request to the service providing apparatus 104-2 (step 1310).

The service providing apparatus 104-2 receives the address transfer request, selects a transfer address as shown in step 1107, and returns an address transfer response to the service providing apparatus 104-1 (step 1311).

The service providing apparatus 104-1 receives the address transfer response, updates the in-charge IP address list 701 thereof, and transmits apparatus information to a service providing apparatus 104-4 as the monitoring apparatus of the service providing apparatus 104-1. In step 1105, the service providing apparatus 104-4 updates the monitor-target service providing apparatus list 801 (step 1312).

Description will now be given of processing when failure occurs in the monitor-target service providing apparatus 104-2.

The service providing apparatus 104-1 periodically sends a load information request to the monitor-target service providing apparatus 104-2 in the processing flow of FIG. 12 (step 1313).

If a timeout takes place a predetermined number of times, for example, R times or more in the reception of the load information, it is assumed that failure has occurred in the monitor-target service providing apparatus 104-2 in step 1204. A request to delete the service providing apparatus 104-2 is sent to all service providing apparatuses 104 based on the service providing apparatus list 601 (step 1314).

Each of the service providing apparatuses 104-3 and 104-4 having received the deletion request updates the service providing apparatus list 601 thereof in step 1109, re-constructs the relationship between the monitoring and monitor-target service providing apparatuses according to the processing flow of FIG. 10, and updates the monitor-target service providing apparatus list 801 and the monitoring service providing apparatus list 901.

For the service providing apparatus 104-1, the monitor target is changed to the service providing apparatus 104-3. Hence, the service providing apparatus 104-1 sends an information acquisition request to the service providing apparatus 104-3 (step 1315).

The service providing apparatus 104-3 having received the information acquisition request returns a response of apparatus information in step 1104 (step 1316).

By referring to FIG. 14, description will be given of processing in a situation in which the service providing apparatus 104-2 is restored from a failed state and is again added to the system.

The manager inputs information of the service providing apparatus 104-2 to the service providing apparatus list 601 of the service providing apparatus 104-2. The service providing apparatus 104-2 arbitrarily selects one of the service providing apparatuses 104 being providing a service (the service providing apparatus 104-4 in this embodiment) and sends a subscription request thereto (step 1402).

The service providing apparatus 104-4 receives the subscription request and transmits an addition request including information of the service providing apparatus 601 to the service providing apparatus 104-2 as the transmission source in step 1110 of FIG. 11. Also, the service providing apparatus 104-4 sends an addition request of service providing apparatus 104-2 to the service providing apparatuses 104-3 and 104-4 other than the transmission source (step 1403).

Each of the service providing apparatuses 104-1 and 104-3 having received the addition request updates the service providing apparatus list 601 in step 1109, re-constructs the relationship between the monitoring and monitor-target service providing apparatuses according to the processing flow of FIG. 10, and transmits, if a change is made in a monitor-target service providing apparatus, an information acquisition request to the monitor-target service providing apparatus (step 1404).

The service providing apparatus 104 having received the information acquisition request returns a response of apparatus information in step 1104 (step 1405).

When failure occurs in the DNS server 103, it is required that an external server detects the condition to re-activate the DNS server 103 or a second DNS server 103. If the DNS server is managing information such as the load information and the information of operation of the service providing apparatus group, it is required that such information is saved in a stable storage during the operation so that the information, is restored at reactivation of the DNS server. This greatly increases the cost to enhance immunity of the system against failure. On the other hand, according to the present embodiment, the DNS server itself has the address group management table 201 as a state which is information invariable with respect to the operation states of the apparatuses 104. The DNS server has neither load information nor operation information of the service providing apparatuses 104. Hence, it is only required that the DNS server 103 is activated by use of one and the same setting in any situation. This makes it possible to remarkably reduce the cost required to cope with failure in the DNS server 103.

Second Embodiment

The first embodiment is an example of the configuration in which all service providing apparatuses 104 are substantially equally managed and any normal service providing apparatus 104 receives a request from the terminal 101.

The second embodiment is configured to include M+N service providing apparatuses 104 classified into N service providing apparatuses 104 to process a request from the terminal 101 and M service providing apparatuses 104 in the standby state. Description will be given of primary difference in the configuration and the processing procedure of the second embodiment as compared with the first embodiment.

FIG. 15 shows a configuration of a service providing apparatus list 1501 according to the second embodiment. In contrast, with the service providing apparatus list 601 of the first embodiment, the configuration of the list 1501 additionally includes a column to indicate whether each service providing apparatus 104 is in the active state (ACT) or in the standby state (SBY).

In the state of the system as indicated by the service providing apparatus list 1501, the monitoring operation of the first embodiment is carried out among the service providing apparatuses 104 in the active state. When failure occurs in a monitor-target service providing apparatus 104, one of the service providing apparatuses 104 in the standby state is selected from the service providing apparatus list 1501 and its state is changed from the standby state to the active state, and then a message including information of the condition is sent to all service providing apparatuses 104. A transfer IP address of the service providing apparatus 104 in which the failure has occurred is transmitted in the form of an address transfer response message to the new service providing apparatus 104 set to the active state as above. It is hence becomes possible that the load distribution is similarly implemented also in the system configuration including N+M service providing apparatuses.

Third Embodiment

In the first and second embodiments, the system selects an unused address for the IP address transfer operation. However, for example, when a session takes a long period of time, a situation in which all addresses are in use may take place. In such situation, no address is available to securely conduct the IP address transfer.

The third embodiment employs a method in which the addresses to be used as response items from the DNS server 103 are classified into a plurality of low-order groups of addresses. By changing the address group for the response items according to "date and time", it is possible to secure an IP address not being used at transfer of IP addresses.

Figure 16:
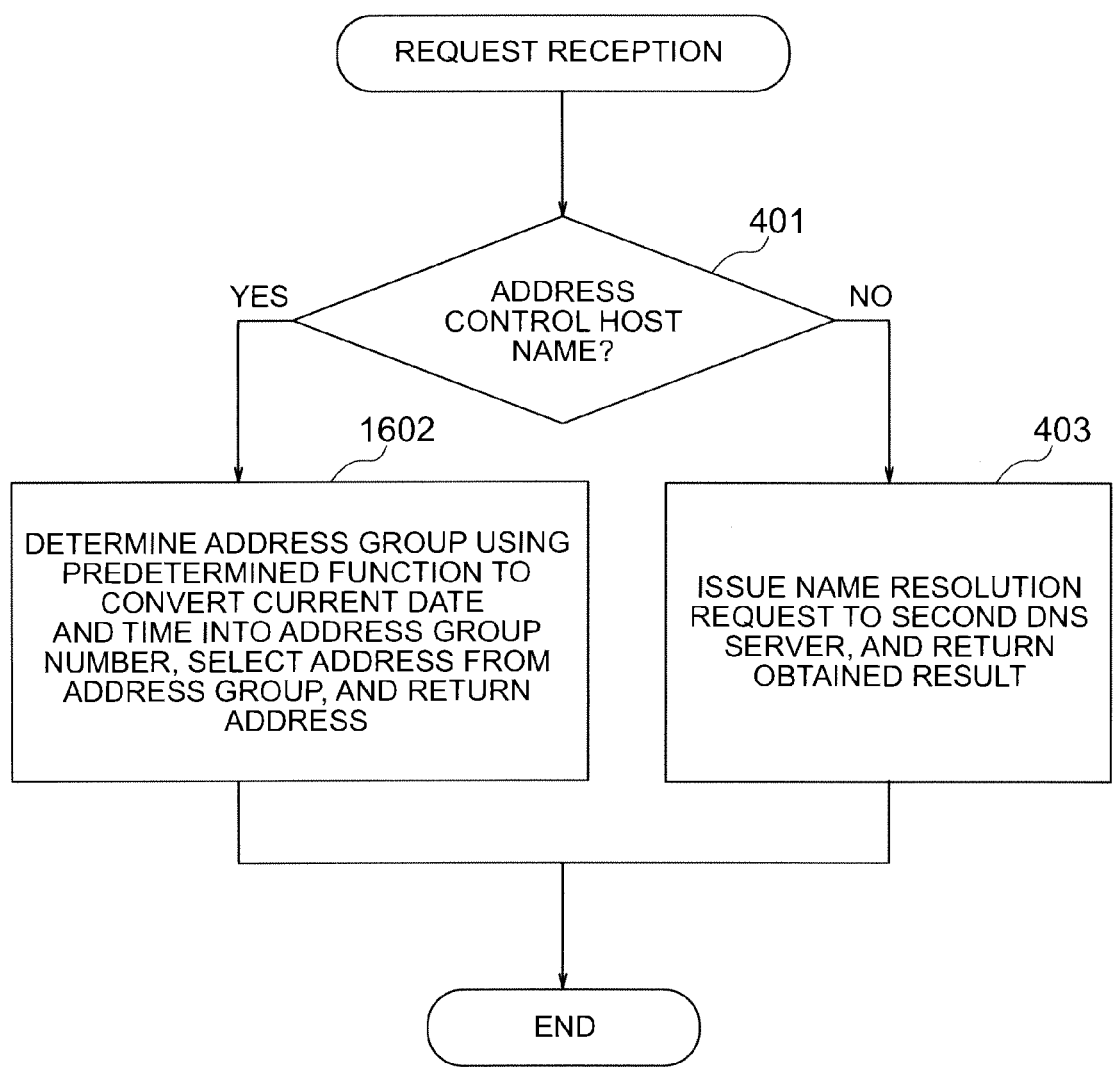
FIG. 16 is a flowchart to explain an example of processing in a DNS server when the IP address group for the response is changed according to "date and time"

FIG. 16 shows operation of the DNS server 103 in the third embodiment. The procedure shown in FIG. 16 differs only in step 1602 from the procedure shown in FIG. 4 for the first and second embodiments.

In step 1602, the DNS server 103 determines at least one address group by use of a predetermined function to convert the current date and time into an address group number and then selects an address from the address group, to return a response of the address.

In this procedure, some address groups are not distributed depending on the "date and time". Assume that a session between a terminal 101 and a service providing apparatus 104 continues at most a predetermined period of time. After an address is completely distributed, when the predetermined period of time lapses, the probability of presence of a terminal 101 using the address is sufficiently low. Hence, at transfer of IP addresses, it is possible to secure an IP address not being used.

Fourth Embodiment

In each of the first, second or the third embodiment, a system of the embodiment includes one DNS server 103. In a system of the fourth embodiment, there is provided a plurality of DNS servers. Each DNS server 103 includes, as a state, a static address group management table 201 and a function to convert "date and time" into an address group number. That is, the DNS server 103 includes no dynamically changing information such as a change in the load and states of service providing apparatuses in the active state.

Figure 17:
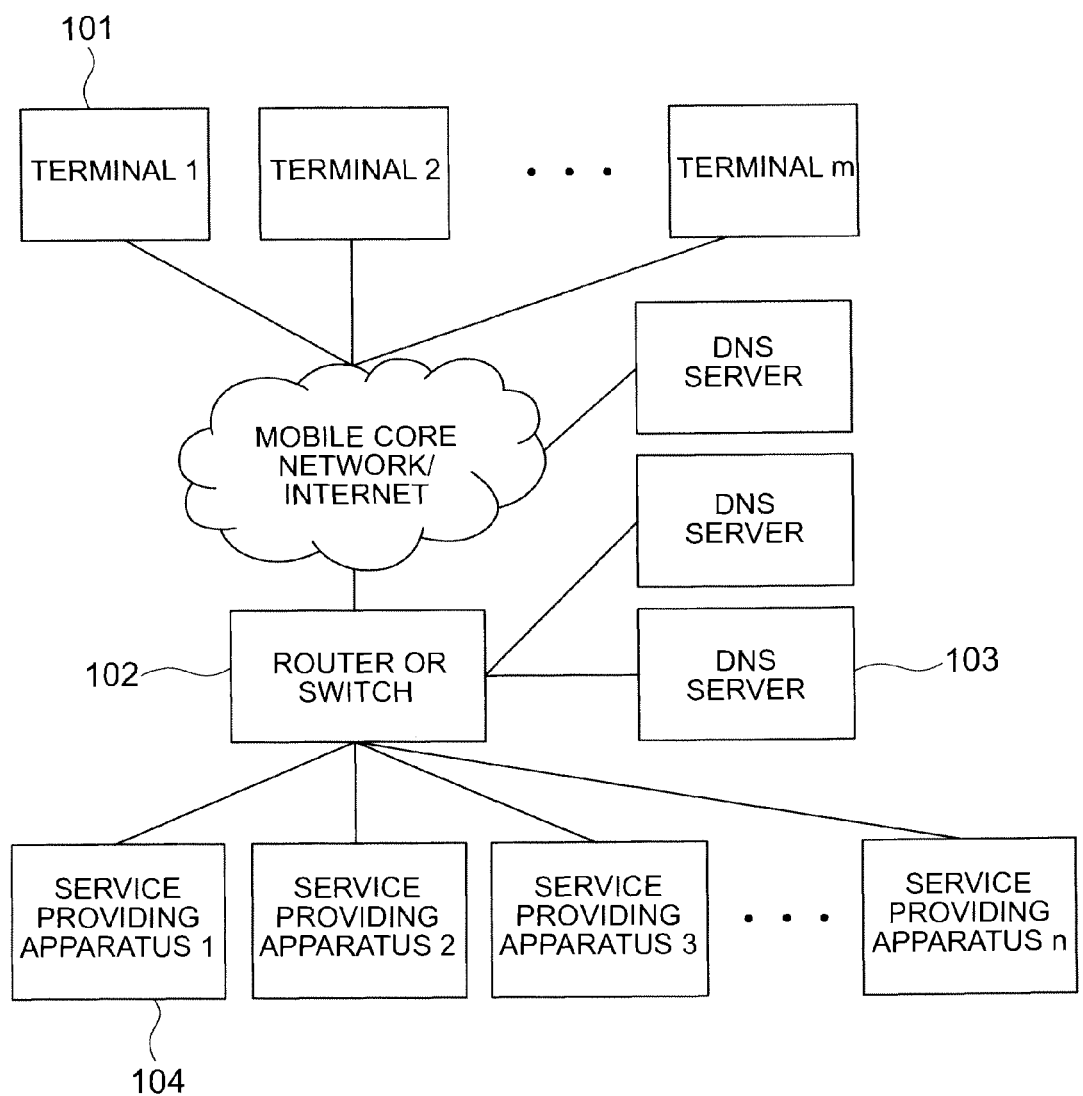
FIG. 17 is a block diagram showing an example of the overall configuration of a service providing system including a plurality of DNS servers.

Hence, even in a situation, in which the system includes a plurality of DNS servers 103 and the terminal side appropriately changes particular DNS servers 103 to actually use such DNS servers 103, it is not required to establish synchronization in the state among the DNS servers 103. FIG. 17 shows an overall configuration of the service providing system according to the fourth embodiment. Due to the configuration of FIG. 17, it is possible to increase performance scalability and immunity against failure of the DNS servers 103.

Although the present disclosure has been described with reference to example embodiments, those skilled in the art wall recognize that various changes and modifications may be made in form and detail without departing from the spirit and scope of the claimed subject matter.

The invention claimed is:

1. A service providing system comprising:
a plurality of service providing apparatuses and
at least one name resolution unit,
one of the service providing apparatuses responding to a service request from a terminal, wherein
the name resolution unit is configured to manage an address group including n IP addresses allocated to a service providing apparatus group including k service providing apparatuses (n is equal to or greater than k) and comprises a name resolution request processing section for selecting, in response to the service request from the terminal, one IP address from the address group managed by the name resolution unit, to thereby make a response,
each of the service providing apparatuses is allocated with m IP addresses (m is equal to or more than zero) selected from the n IP addresses managed by the name resolution unit, without duplication with respect to any other one of the service providing apparatuses, and comprises:
a terminal request processing section configured to provide, based on the response to the name resolution request, a service to the service request from the terminal, and
a load distributing function section configured to conduct load distribution of a load between the service providing apparatus and any one other of the service providing apparatuses, wherein
each of the plurality of the service providing apparatuses is configured to be a monitor-target service providing apparatus whose load is monitored by any one other of the service providing apparatuses as a monitoring service providing apparatus; and
the load distributing function section of the monitoring service providing apparatus is configured to move, when a high load is imposed on the monitor-target service providing apparatus, allocation of IP addresses from the monitor-target service providing apparatus to the monitoring service providing apparatus.

2. A service providing system according to claim 1, wherein the load distributing function section of the monitoring service providing apparatus
is configured to transmit, in the moving of allocation of IP addresses, an address transfer request to the monitor-target service providing apparatus when the load on the monitor-target service providing apparatus is higher at least a predetermined value than a load on the monitoring service providing apparatus, and
register, at reception of an address transfer response including IP addresses as an object of the moving of allocation of IP addresses from the monitor-target service providing apparatus, the IP addresses included in the address transfer response, as IP addresses to be allocated to the monitoring service providing apparatus.

3. A service providing system according to claim 2, wherein in response to the address transfer request, the load distributing function section of the monitor-target service providing apparatus is configured to select one of the IP address the in-charge IP addresses allocated to the monitoring service providing apparatus, delete allocation of the IP address thereto, and transmit the address transfer response, to thereby notify the response to the monitoring service providing apparatus.

4. A service providing system according to claim 1, wherein
the IP addresses in the moving of allocation of IP addresses are IP addresses not being used,
the name solution unit is configured to manage an address group under control thereof by dividing the address group into at least two low-order groups, and
select, according to date and time, one of the low-order groups to which an address to be selected for the name resolution request from the terminal belongs.

5. A service providing system according to claim 1, wherein
the load distributing function section of the monitoring service providing apparatus is configured to manage previous date and time when the allocation of IP addresses is moved from a monitor-target service providing apparatus to the monitoring service providing apparatus, and
move the allocation of IP addresses if difference between current date and time and the previous date and time is equal to or more than a predetermined value.

6. A service providing system according to claim 1, wherein
the load distributing function section of the monitoring service providing apparatus
is configured to monitor each of the monitor-target service providing apparatuses in operation,
manage candidates of IP addresses of which allocation is moved from the monitor-target service providing apparatus to the monitoring service providing apparatus, and
register, if it is judged, as a result of monitoring, that failure has occurred in the monitor-target service providing apparatus, the candidates of IP addresses which are under control thereof and of which allocation is to be moved, as IP addresses to be allocated to the monitoring service providing apparatus.

7. A service providing system according to claim 6, wherein
the k service providing apparatuses are divided into two groups comprising a group of service providing apparatuses in operation and a group of service providing apparatuses in a standby state, and
the load distributing function section of the monitoring service providing apparatus in operation
is configured to monitor each of the monitor-target service providing apparatuses in operation,
select, if it is confirmed that failure has occurred in the monitor-target service providing apparatus, one of the service providing apparatuses in the standby state, as a new monitor-target service providing apparatus, and
send, to the new monitor-target service providing apparatus, an address transfer response including the IP addresses allocated to the monitor-target service providing apparatus in which failure has occurred.

8. A server device group comprising:
a plurality of "k" ("k" shows plural) server devices respectively coupled to a network with a routing function;
each of the plurality of "k" server devices being configured to receive one access via the network, wherein
each of the plurality of "k" server devices is assigned at least one of "n" ("n" shows an integer greater than or equal to "0") addresses, each of the addresses being different from each other capable of being assigned to any of one of the plurality of "k" server devices,
the server device group is configured to change a destination of assignment of 1 through (m−1) addresses out of "m" addresses, "m" showing an integer greater than or equal to "2", having been assigned to a first server device toward a second server device with a lower load than the first server device, and
the second server device is configured to receive an access via the network directed to the 1 through (m−1) addresses having been assigned thereto.

9. The server device group according to claim 8, wherein the second server device is further configured to send a notice of the change of assignment of addresses toward the routing function.

10. The server device group according to claim 9, wherein used for the notice is a gratuitous ARP message.

11. The server device group according to claim 8, further comprising a load monitoring function, wherein
the load monitoring function is configured to send an address taking over request toward the first server device in case that difference of loads between the first and second server devices is greater than or equal to a predetermined amount of value, and
the second server device is further configured to register thereto the 1 through (m−1) addresses on the basis of a response of the first server to the address taking over request.

12. The server device group according to claim 11, wherein the first server device is configured to select an address having been assigned to the first server addressed in response to the address taking over request, and to delete the assignment of the selected address having been registered within the first server device, and send a response to the request toward the monitoring function.

13. The server device group according to claim 8, wherein the monitoring function is further configured to manage date and time of the change of assignment of address, and to calculate the difference of loads between the first and second server devices in case that a predetermined period has lapsed from the date and time of the change.

14. The server device group according to claim 8, wherein the monitoring function is further configured to manage candidates of addresses including the 1 through (m−1) addresses for the change of assignment.

15. The server device group according to claim 14, wherein the monitoring function is configured to make the change, in case that a failure occurs, a destination of assignment of the candidate of addresses from the first server to the second server.

16. The server device group according to claim 8, wherein each of the plurality of "k" server devices includes the monitoring function.

17. A network system comprising:
a server device group including a plurality of "k" ("k" shows plural) server devices respectively coupled to a network with a routing function, each of the plurality of "k" server devices being configured to receive an access via the network, wherein
each of the plurality of "k" server devices is assigned at least one of "n" ("n" shows an integer greater than or equal to "0") addresses, each of the addresses being different from each other capable of being assigned to any of one of the plurality of "k" server devices,
the server device group is configured to change a destination of assignment of 1 through (m−1) addresses out of "m" addresses, "m" showing an integer greater than or equal to "2", having been assigned to a first server device toward a second server device with a lower load than the first server device,
the second server device is configured to receive an access via the network directed to the 1 through (m−1) addresses having been assigned thereto, and a name resolution device,
the name resolution device is configured to, when each of the 1 through (m−1) addresses which is an object to be changed has not been used,
manage the "n" addresses with classifying into two or more groups, and
switch, in a predetermined timing of period, a group of addresses between one or more groups of addresses from which an address for an answer to the request is selected and the other one or more groups of addresses in which an address for the answer is not included.

* * * * *